(12) United States Patent
Bendel et al.

(10) Patent No.: US 11,156,018 B2
(45) Date of Patent: Oct. 26, 2021

(54) MOTOR VEHICLE LOCK

(71) Applicant: Kiekert AG, Heiligenhaus (DE)

(72) Inventors: Thorsten Bendel, Oberhausen (DE);
Werner Pohle, Dortmund (DE);
Thorsten Nottebaum, Mühltal (DE)

(73) Assignee: Kiekert AG, Heiligenhaus (DE)

( * ) Notice: Subject to any disclaimer, the term of this patent is extended or adjusted under 35 U.S.C. 154(b) by 153 days.

(21) Appl. No.: 16/079,401

(22) PCT Filed: Jan. 24, 2017

(86) PCT No.: PCT/DE2017/100039
§ 371 (c)(1),
(2) Date: Oct. 29, 2018

(87) PCT Pub. No.: WO2017/144043
PCT Pub. Date: Aug. 31, 2017

(65) Prior Publication Data
US 2019/0153748 A1      May 23, 2019

(30) Foreign Application Priority Data

Feb. 26, 2016   (DE) .................... 10 2016 103 423.1

(51) Int. Cl.
| | | |
|---|---|---|
| *E05B 17/10* | (2006.01) | |
| *B60Q 1/26* | (2006.01) | |
| *E05B 17/22* | (2006.01) | |
| *E05B 81/54* | (2014.01) | |

(52) U.S. Cl.
CPC ............ *E05B 17/10* (2013.01); *B60Q 1/2669* (2013.01); *E05B 17/226* (2013.01); *E05B 81/54* (2013.01)

(58) Field of Classification Search
CPC ........ E05B 17/10; E05B 17/226; E05B 81/54; B60Q 1/2669
USPC .......................................................... 70/237
See application file for complete search history.

(56) References Cited

U.S. PATENT DOCUMENTS

| | | | |
|---|---|---|---|
| 5,729,057 A | 3/1998 | Frenzel | |
| 9,127,477 B1 | 9/2015 | Yang | |
| 10,597,911 B2 * | 3/2020 | Bendel | ................... B60Q 3/267 |
| 2005/0219854 A1 * | 10/2005 | Grady | .................... B60Q 3/267 |
| | | | 362/490 |
| 2006/0290518 A1 * | 12/2006 | Bingle | ................... G08B 13/19 |
| | | | 340/573.1 |

(Continued)

FOREIGN PATENT DOCUMENTS

| | | |
|---|---|---|
| CN | 101684895 A | 3/2010 |
| DE | 3908095 | 9/1989 |

(Continued)

OTHER PUBLICATIONS

International Search Report and Written Opinion of PCT/DE2017/100039 dated Mar. 17, 2017.

(Continued)

*Primary Examiner* — Suzanne L Barrett
(74) *Attorney, Agent, or Firm* — Renner, Otto, Boisselle & Sklar, LLP

(57) ABSTRACT

A motor vehicle lock comprising a lock housing, an electric power supply and at least one illuminant which can be connected to the electric power supply, emits light into a light-guiding element and can be placed directly on a circuit board located inside the lock housing.

12 Claims, 2 Drawing Sheets

(56) References Cited

U.S. PATENT DOCUMENTS

Figure 1:
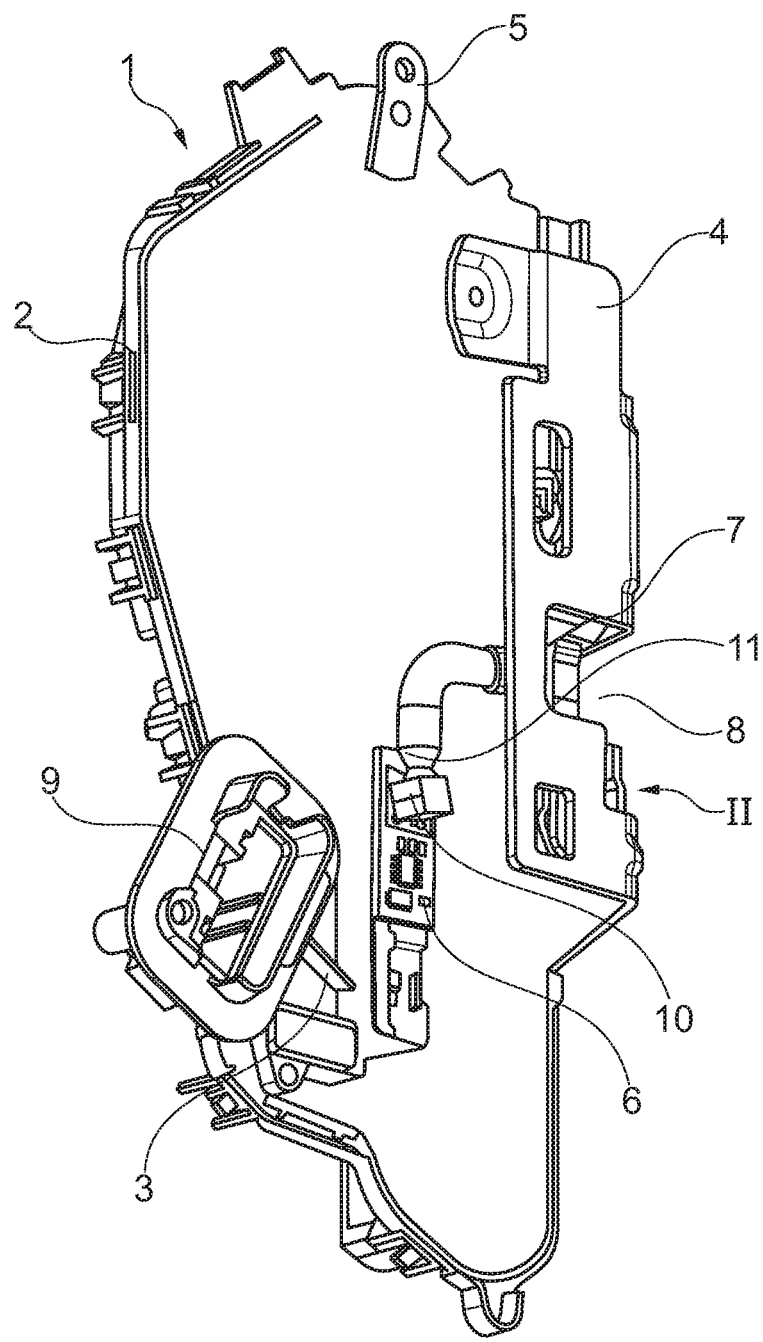

2007/0258258 A1\* 11/2007 Wang .................... E05B 17/10
                                                                          362/501
2012/0274457 A1\* 11/2012 Burns .................... E05B 81/66
                                                                          340/425.5

FOREIGN PATENT DOCUMENTS

| | | |
|---|---|---|
| DE | 19528093 | 2/1997 |
| DE | 19934951 A1 | 2/2001 |
| DE | 10119010 A1 | 10/2002 |
| DE | 102006032373 A1 | 1/2008 |
| DE | 202008005174 | 8/2009 |
| DE | 102010050183 | 6/2011 |
| DE | 102014003505 | 9/2015 |
| JP | 2002-264651 | 9/2002 |
| JP | 2004058882 A | 2/2004 |
| WO | WO 2004113654 | 12/2004 |
| WO | WO 2014183741 | 11/2014 |

OTHER PUBLICATIONS

International Preliminary Report on Patentability of PCT/DE2017/100039 dated Aug. 28, 2018.
Translation of Office Action 1 for related Chinese Application No. 2017800204250 dated Mar. 13, 2020.
Translation of Japanese Office Action dated Aug. 11, 2020, for related Japanese Application No. 2018-544805.

\* cited by examiner

MOTOR VEHICLE LOCK

The invention relates to a motor vehicle lock comprising a lock housing, an electric power supply and at least one illuminant, wherein the illuminant can be connected to the electric power supply, and wherein the illuminant emits light into a light guiding element.

Motor vehicles used in road traffic are subject to a range of safety regulations. In particular, motor vehicle illumination has increasingly come into the foreground in recent years. There are thus already motor vehicles which have driving lights which also illuminate the motor vehicle in the daytime, thus increasing its visibility to road users. These lights are independent of the dipped headlights and main beam which are used during the hours of darkness. The motor vehicle light is therefore a safety-relevant means.

To further increase the safety of motorists and other road users, it is also known to execute an opening door and/or flap of a motor vehicle with an illuminant, reflectors or luminescent components so that other road users can display the movements on the motor vehicle by means of a light effect.

Thus, for example, a motor vehicle locking device has become known from JP 2002-264651 A1 in which the catch arranged on the locking system is equipped with a luminescent surface so that a light effect is generated in darkness and/or in conditions of poor visibility which increases motor vehicle safety. For example, a motor vehicle lock for a lateral door is portrayed in the publication in which the catch of the motor vehicle lock remains visible in the open state through an infeed section of the motor vehicle lock, even if the catch or the locking mechanism of the motor vehicle lock is in the open, i.e. unlocked, state.

From DE 39 08 095 A1, rear lights and reflectors are also known which indicate opening of the door or reflect light falling on the door during opening of the door or display as an illuminant that the door is open. A door set-up element is revealed which is equipped with different lights, such as a reading light, a rear light and a floor light. The door set-up element can also encompass reflectors. A rear light can also be integrated into an edge of the inlet slot, whereby the inlet slot is uniformly extended. All of these measures help to make road users aware of an open or opening door and thus guarantee traffic safety.

From DE 20 2008 005 174 U1, a motor vehicle lock arrangement for a motor vehicle door has become known in which the motor vehicle lock is formed with a light arrangement, wherein the light arrangement has an electrical light source, the light irradiation of which can be emitted via an illuminating element. In one embodiment, the light source can thus be inserted into the lock housing so that only the light-emitting surface of the light source protrudes outwards from the lock housing. However, a light source is preferably revealed in DE 20 2008 005 174 U1 which interacts with a light conductor, which transmits the light of the light source to a light element, wherein the light element encompasses a lens to emit the light irradiation.

The display means or illuminant known from the state of the art have the disadvantage that they either do not provide sufficient light intensity or follow the voltage fluctuations in the motor vehicle so that it cannot be guaranteed that a reliable safety characteristic can be provided on the motor vehicle by means of the illuminant.

The objective of the invention is to provide an improved motor vehicle locking device which overcomes the disadvantages of the state of the art. Furthermore, it is an object of the invention to provide a uniform safety device with high density intensity or an illuminant device on the motor vehicle. It is also an object of the invention to provide a cost-effective and structurally simple securing system for a motor vehicle locking device.

The objective is solved according to the invention by the characteristics of independent patent claim 1. Advantageous configurations of the invention are stated in the sub-claims. It is pointed out that the exemplary embodiments described hereafter are not restrictive; instead, any possible variations are possible of the characteristics described in the description and the sub-claims.

According to patent claim 1, the objective of the invention is solved by a motor vehicle lock being provided, having a lock housing, an electric power supply, at least one illuminant, wherein the illuminant can be connected to the electrical power supply and wherein the illuminant emits light into a light guiding element and the illuminant can be arranged directly on a circuit board arranged inside the lock housing. By means of the formation of a motor vehicle lock according to the invention with a circuit board arranged inside the lock housing on which the illuminant is simultaneously arranged the possibility is now created of providing an illuminant which always illuminates the light guiding element with the same light intensity and can thus be used for reliable attainment of a safety characteristic in the motor vehicle. In particular, the arrangement of the circuit board hereby enables the illuminant to be optimally supplied with voltage so that the illuminant can work almost independently from a voltage fluctuation in the motor vehicle. A voltage fluctuation can occur, for example, by the motor vehicle being started and/or the motor vehicle being illuminated.

In these cases, the voltage in the motor vehicle's electrical system fluctuates which in turn leads to voltage fluctuations in the illuminants which thus lose light intensity. By integrating a circuit board into the lock, the possibility now exists of operating the illuminant regardless or almost regardless of the voltage of the electrical system so that uniform voltage is always available in order to continually and uniformly supply the illuminant with voltage.

as motor vehicle locks here motor vehicle lateral door locks are to be preferably considered. Motor vehicle locks are not only used on doors, flaps, hoods and/or sliding doors, but can also be used, for example, in the area of covers, as on Cabrio roofs, for example. In addition to the warning function, which is preferably the focus on doors or flaps, the illumination device according to the invention can also serve on flaps, for example, to display whether the flap is fully and correctly closed. Thus, the locking device can encompass a microswitch, for example, which is only switched when the locking device reaches its final, closed position. Furthermore, illumination of the flap, locks, sliding doors and/or hoods can also serve to illuminate further functional elements, such as a switch or a securing element, and thus make these visible for the operator with reduced visibility. In relation to a switching means, such as a microswitch, on motor vehicle locks and in particular door locks there is a main ratchet position of the locking mechanism in which a catch is ratcheted by means of a pawl, for example, in which a microswitch can be queried to control the illuminant.

The motor vehicle lock also has a lock housing which is preferably made of plastic. A lock housing preferably consists of two parts, a housing base and a housing lid which can be connected mostly or at least partially in a waterproof manner. The lock housing is formed such that an opening area of the lock which interacts with a lock holder, for example, is executed in a circumferential manner. This opening area is also called an opening section. The lock housing encompasses a lock plate to stabilize the lock and in particular to stabilize a locking mechanism located in the lock. The lock plate can encompass the lock housing, at least in places, whereby the lock plate can also encompass the opening section, dependent on the embodiment.

The motor vehicle lock furthermore has a power supply, whereby the electric current is usually supplied to the lock by means of a plug and whereby the current can be distributed via conductors and/or a leadframe. The illuminant is preferably directly arranged on a conductor. With particular preference, a LED is used as an illuminant which is directly arranged on the conductor circuit board. The direct arrangement on a circuit board offers the advantage that control is facilitated.

Use of a light guiding element is advantageous to the extent that because the possibility is created of arranging the illuminant in the motor vehicle lock and in particular directly on the circuit board at will. By means of the light guiding element the possibility is then created of transmitting the light emitted by the illuminant to any surface of the motor vehicle lock or the locking device.

The at least one illuminant can be supplied with voltage by means of the electrical supply. When a power supply is combined with a separate arrangement of a circuit board inside the motor vehicle lock the possibility now exists on the one hand of using an available power supply in the motor vehicle lock to control the illuminant which, in turn, offers a constructive and also a cost-effective solution to supply voltage to the illuminant. Furthermore, with the light element the possibility is created of arranging the illuminant in an area in the lock which is arranged at a distance to the actual light emitting aperture in the motor vehicle. By means of the circuit board, the voltage fluctuations are thus able to form a cost-effective and structurally simple arrangement of the power supply for the illuminant and the light can be deflected by means of the light guiding element and conducted in a targeted manner to a light emitting aperture.

In one embodiment of the invention, the circuit board is arranged on an electrocomponent carrier of the motor vehicle lock. An electrocomponent carrier is part of the electric power supply and can be inserted as a separate component into the lock housing or integrated in at least a part of the lock housing. An electrocomponent carrier is formed in a lead frame, for example, which is overmolded with plastic, wherein parts of the lead frame protrude from the plastic and form contact elements for electric components. Simultaneously, the electrocomponent carrier can encompass a plug with which the motor vehicle lock on the motor vehicle can be connected or adapted. Advantageously, the circuit board is connected directly to the electrocomponent carrier, i.e. the lead frame and/or conductors of the electrocomponent carrier are contacted with the circuit board. If conductors and/or a lead frame are named in relation to the electrocomponent carrier, these are thus only exemplary embodiments for cables, with which control signals or supply voltages can be conducted into or out of the lock. For example, separate electric leads in the form of cables can also be part of the electrocomponent carrier, at least in places.

If the circuit board has control means, in particular control electronics for the illuminant, a further advantageous embodiment of the invention thus results. The motor vehicle's electrical system can have voltage fluctuations which are due to, for example, high stresses needing to be provided by consumers. At this time, if the motor vehicle is started, for example, a Cabrio roof is closed or opened or if, for example, many consumers switch on simultaneously, voltage fluctuations can thus occur in the supply cables in the motor vehicle lock. To balance out voltage fluctuations, to control the light intensity and/or, for example, for a color change, electric components, such as resistances, capacities, switching means, microprocessors and comparable electronic components can be arranged on the circuit board. According to the scope of control of the illuminant, a constant voltage can be supplied to the illuminant which causes uniform light intensity in the illuminant in turn. According to the invention, it is thus possible to supply the illuminant uniformly and with constant power or a desired target value to the current in order to provide a light intensity in the motor vehicle lock which can be individualized.

In a further embodiment of the invention, the light guiding element is directly connected to the illuminant. The direct connection of the light guiding element to the illuminant hereby enables a high light intensity to be initiated into the light guiding element. Thus, the least possible loss radiation can be reckoned with or a minimum of light emitted from the illuminant is lost. Ideally, the entire light emitted by the illuminant is emitted or initiated into the light guiding element. Direct connection hereby means that the light guiding element is in contact with the illuminant.

If a light guiding cone is arranged between the light guiding element and the illuminant, a further advantageous embodiment of the invention thus results. A light guiding cone hereby causes the light to be optimally initiated into the light guiding element. If the light guiding element is cylindrical, for example, the light guiding cone is thus also a conical cylindrical shape. However, the light guiding cone can also, for example, in the case of a rectangular or quadratic light guiding element, have a conical and quadratic or a rectangular conical shape. The light guiding cone can hereby be formed such that starting from a circular contact surface on the illuminant, for example, it can be connected to the light guiding element in an extending conical shape. The light guiding cone can be formed as a single component or multiple components with the light guiding element. In a preferred embodiment, the end area, i.e. the area at a distance from the illuminant, has a geometrical shape corresponding to the light guiding element.

In one embodiment, an advantage then results if the light guiding element is made of plastic, preferably polycarbonate or polymethyl methacrylate. Polycarbonate (PC) or polymethyl methacrylate (PMMA) are synthetic, transparent, thermoplastic plastics with an advantageous light guiding characteristic. In particular, in combination with reflective surfaces, diffusing elements and a suitable surface shape, for example, a high light intensity can be transported according to the invention by means of the light guiding element so that light transport can be significantly increased, starting from the illuminant to the light emitting surfaces on the light guiding element. Furthermore, plastic and in particular thermoplastic plastic offers the advantage of attaining any shapes so that easy installation of the light guiding element in the motor vehicle lock is enabled.

In a further embodiment of the invention, a further advantage results if the light guiding element with an end opposite the illuminant ends in an area which enables light to be emitted into an environment of the motor vehicle in the installed state of the motor vehicle lock. The direct illumination from the motor vehicle lock according to the invention enables specific areas in, on or in the vicinity of the motor vehicle to be illuminable. Specific areas, such as a securing element, emergency operation or an entrance area or a locking lever arranged in the flap area or a switching means can be illuminated or floodlit, for example. A child lock can, for example, be floodlit, or an operating lever for an additional flap or, for example, a switch to operate a trailer coupling. By means of the light emission on the motor vehicle lock, the safety and/or functionality of the motor vehicle can thus be increased. Environment thus not only encompasses the area which affects other road users and indicates an opening door, for example, but also the area which extends around the lock and, for example, illuminates other functions, such as a sliding door switch.

If the light guiding element ends in the infeed section of the motor vehicle lock, a preferred embodiment of the invention thus results. Advantageously, the light guiding element can extend into the infeed section of the motor vehicle lock and form a light emitting surface there. The infeed section of the motor vehicle lock is located by a lateral door, for example, in an area visible for other road users. In particular where visibility is restricted, door opening can thus be indicated very easily and safely, for example. In the case of a tailgate lock, the infeed section, for example, is aligned in the direction of the trunk, so that illumination of the trunk and/or the tailgate area of the motor vehicle is enabled. Thus, for example, an additional switch can be facilitated for a trailer coupling or unloading of the motor vehicle, for example.

Furthermore, a person located behind the motor vehicle can also be illuminated so that he/she is easily visible for other road users or handling is facilitated in the rear area of the motor vehicle. If the light emitting aperture is arranged in the infeed section of a sliding door, exiting can hereby be facilitated, for example, and/or a sliding door switch can be illuminated. In the case of insertion into a lock for a flap or cover, a securing element can be emphasized by the illuminant in the infeed section, for example, which can be manually operated by an operator, for example. As shown, a multitude of advantages can be attained by the arrangement of the end area of the light guiding element in the infeed section.

If the circuit board is substantially arranged parallel to a surface of a lock plate encompassing the lock housing at least in places, a further advantageous embodiment of the invention thus results. Arrangement of the circuit board and/or the illuminant in proximity to a lock plate and a corresponding practically parallel arrangement offers the advantage of high security for the illuminant function. In particular, the high stability of a lock plate, which is usually molded from a 3-5 mm thick steel sheet, enables protection of the illuminant even at high stresses, as occur in the case of accident, for example. An illuminant is thus always available which retains its function in particular in case of damage to the door and can thus increase motor vehicle safety.

If the light guiding element has an opaque and/or light-reflecting sheath, a further advantageous embodiment of the invention thus results. An opaque or light-reflecting sheath or sheathing of the light guiding element here prevents scatter radiation from being emitted from the light guiding element, but deflected it in the direction of an emission surface of the light guiding element. This increases the light intensity and enables maximum light intensity to be transported or directed from the illuminant in the direction of the light emitting surface. Conceivable is also a first light-reflecting layer on the light guiding element and a further opaque layer so that the characteristics are advantageously added for the invention.

In one embodiment of the invention, the light guiding element is guided and/or fixed in the lock housing. The light guiding element can preferably be formed as a single or multiple component as a separate component. Guiding of the light guiding element through the lock housing herein enables the light guiding element to be securely fixed in the motor vehicle lock and to targetedly cause a targeted deflection and emission of the light. By means of formation of the lock housing as a holding means, additional constructional measures to fix the light guiding element in the motor vehicle can be dispensed with.

The invention is described in further detail below with reference to the attached drawings on the basis of exemplary embodiments. However, the principle applies that the exemplary embodiments do not restrict the invention, but only constitute advantageous embodiments. The characteristics portrayed can be executed individually or in combination with other characteristics of the description and also the patent claims individually or in combination.

Figure 2:
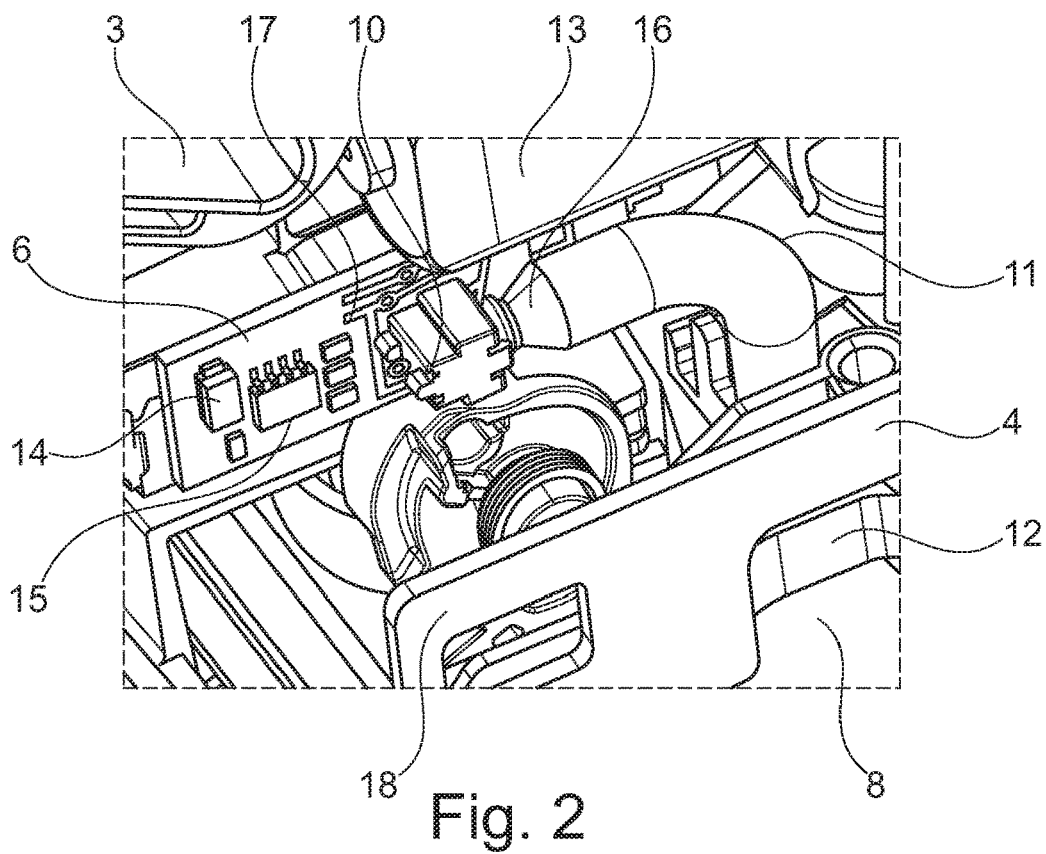
Figure 3:
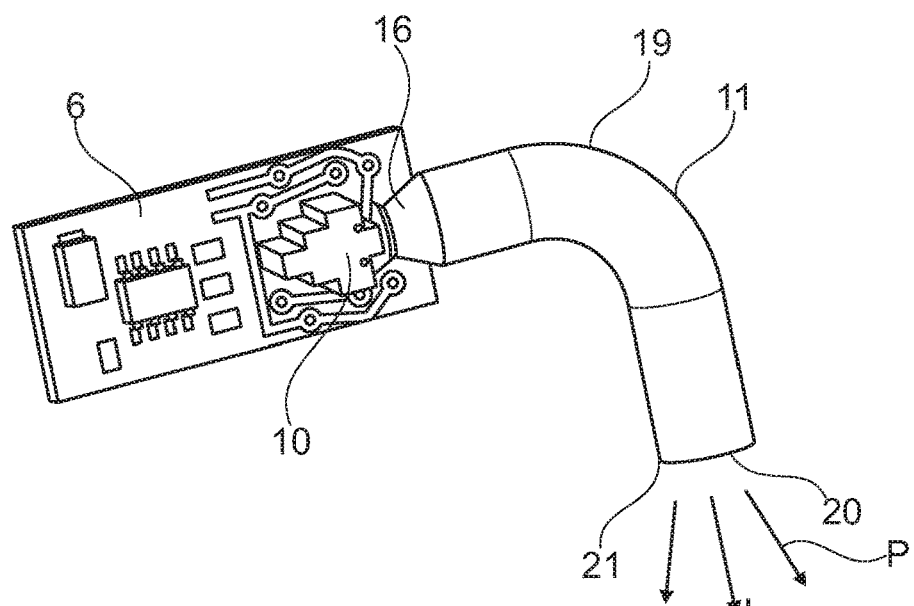

The following are shown:

FIG. 1 a three-dimensional view of a motor vehicle lock which is only partially illustrated, with a component of the lock housing, an electrocomponent carrier with a circuit board and an illuminant, and a connected light guiding element and a lock plate in a three-dimensional view, FIG. 2 a detailed view according to arrow II from FIG. 1 in the area of the infeed section and the arrangement of the circuit board on the electrocomponent carrier in the motor vehicle lock, and FIG. 3 a separate illustration of the circuit board with illuminant attached, light guiding cone and light guiding element.

A three-dimensional view of a motor vehicle lock 1 is shown in FIG. 1. Only the components necessary for explanation of the function of an exemplary embodiment are illustrated. The motor vehicle lock 1 encompasses a lock housing 2, an electrocomponent carrier 3, a lock case, an operating lever 5 and a circuit board 6 arranged on the electrocomponent carrier 3. The lock case 4 encompasses the lock housing 2 at least in part and has an aperture 7 which forms an infeed section 8 for a lock holder which is not illustrated which interacts with the motor vehicle lock 1.

A plug or a socket 9 is formed on the electrocomponent carrier 3, by means of which the motor vehicle lock 1 can be connected to a control device and/or a power supply of the motor vehicle lock. The circuit board 6 is directly arranged and electrically contacted on the electrocomponent carrier 3. An illuminant 10 in the form of an LED is electrically contacted and attached to the circuit board 6. A light conductor 11 is connected to the illuminant 10 which extends into the lock housing 2 and in the direction of the infeed section 9 of the motor vehicle lock 1.

FIG. 2 shows a detailed view from the direction of arrow II from FIG. 1. The same components are equipped with identical reference signs. The lock case 4, the infeed section 8 and the catch 12 located in the infeed section 8 are apparent. An electromotor 13 is directly connected or electrically contacted to the electrocomponent carrier 3. The circuit board 6 is furthermore apparent with the electronic components 14, 15 arranged on the circuit board 6. The illuminant 10 can be controlled by means of the electronic components 14, 15.

A light guiding cone 16, which has a cone shape in this exemplary embodiment, is directly connected to the illuminant 10. Directly connected to the light guiding cone 16 is the light guiding element 11 which extends in the direction of the infeed section 8 of the motor vehicle lock 1. The illuminant 10 is contacted or electrically connected to the circuit board 6 by means of the conductors 17 arranged on the circuit board 6. In turn, the circuit board 6 is electrically contacted to the electrocomponent carrier 3 and is directly supplied via the electrocomponent carrier 3.

In this exemplary embodiment, the circuit board 6 is substantially arranged parallel to the extension 18 of the lock case 4. The extension 18 forms the part of the lock case 4 which extends at least partially around the infeed section 8.

In FIG. 3, the circuit board 6, the illuminant 10 and the light conductor 11 are shown detached from the motor vehicle lock 1. The light guiding element 11 has an angle 19 of almost 90°. Light L is emitted from a light emitting aperture 21 at the end 20 of the light conductor 11. As is apparent, the light L can be focused or scattered from the light conductor 11 according to the formation of the light emitting aperture which is illustrated with the arrows P.

If a signal is generated, for example, by a switching element which queries the position of the catch 12, for example, that the door is being opened, the control device located in the motor vehicle and/or the electronic components 14, 15 in the motor vehicle door lock 1 can generate a signal which supplies the illuminant 10 with voltage. The electronic components 14, 15 control and/or regulate the voltage supply for the illuminant, so that the illuminant 10 is supplied with continual, adjustable control voltage. The light L generated by the illuminant 10 goes via the light guiding cone 16 into the light guiding element 11 and is deflected by the light guiding element and can be emitted from the light emitting aperture 21. Due to the arrangement of the illuminant on the circuit board, constant voltage can be transmitted to the illuminant 10 which serves for safer illumination of a light emitting aperture 21 in the infeed section 8, for example.

REFERENCE SIGN LIST

1 Motor vehicle lock
2 Lock housing
3 Component carrier
4 Lock case
5 Operating lever
6 Circuit board
7 Aperture
8 Infeed section
9 Plug
10 Illuminant
11 Light guiding element
12 Catch
13 Electromotor
14, 15 Electronic components
16 Light guiding cone
17 Conductors
18 Extension
19 Angle
20 End of light conductor
21 Light emitting aperture
L Light
P Arrow

The invention claimed is:

1. A motor vehicle lock comprising a lock housing that defines an infeed section configured to accommodate a catch of the motor vehicle lock and a lock holder that interacts with the catch, an electric power supply and at least one illuminant wherein the illuminant can be connected to the electric power supply, wherein the illuminant emits light into a light guiding element, wherein the illuminant is placed directly on a conductor of a circuit board located inside the lock housing that distributes current whereby light intensity of the illuminant is controlled to balance voltage fluctuations and maintain a uniform light intensity in the illuminant, wherein the light guiding element has a shape that is formed to deflect the light from the illuminant in a different direction relative to a direction in which the illuminant emits light and ends with an end in an area which is distant relative to an area in which the illuminant is arranged which enables light to be emitted in an environment of the motor vehicle in the installed state of the motor vehicle lock, and wherein the light guiding element ends in the infeed section of the motor vehicle lock.

2. The motor vehicle lock according to claim 1, wherein the circuit board can be arranged on an electrocomponent carrier of the motor vehicle lock.

3. The motor vehicle lock according to claim 1, wherein the circuit board has control electronics to control the illuminant.

4. The motor vehicle lock according to claim 1, wherein the light guiding element is directly connected to the illuminant.

5. The motor vehicle lock according to claim 1, wherein a light guiding cone is arranged between the light guiding element and the illuminant.

6. The motor vehicle lock according to claim 1, wherein the light guiding element is formed from a plastic.

7. The motor vehicle lock according to claim 1, wherein the circuit board is arranged substantially parallel to an extension a lock plate encompassing the lock housing at least in part.

8. The motor vehicle lock according to claim 1, wherein the light guiding element has an opaque and/or light-reflecting sheathing.

9. The motor vehicle lock according to claim 1, wherein the light guiding element is guided and/or fixed in the lock housing.

10. The motor vehicle lock according to claim 6, wherein the plastic is polycarbonate or polymethyl methacrylate.

11. The motor vehicle lock according to claim 5, wherein the light guiding cone is directly connected to the illuminant.

12. The motor vehicle lock according to claim 5, wherein the light guiding element has an angle of approximately 90 degrees between the light guiding cone and a light emitting aperture.

* * * * *